United States Patent
Tomita

(10) Patent No.: US 10,668,464 B2
(45) Date of Patent: Jun. 2, 2020

(54) LIQUID SAMPLE INTRODUCTION DEVICE

(71) Applicant: SHIMADZU CORPORATION, Kyoto-shi, Kyoto (JP)

(72) Inventor: Masami Tomita, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 637 days.

(21) Appl. No.: 15/317,621

(22) PCT Filed: Jun. 11, 2014

(86) PCT No.: PCT/JP2014/065433
§ 371 (c)(1),
(2) Date: Dec. 9, 2016

(87) PCT Pub. No.: WO2015/189927
PCT Pub. Date: Dec. 17, 2015

(65) Prior Publication Data
US 2017/0106364 A1    Apr. 20, 2017

(51) Int. Cl.
*G01N 30/16* (2006.01)
*G01N 30/20* (2006.01)
(Continued)

(52) U.S. Cl.
CPC .............. *B01L 3/502* (2013.01); *G01N 30/16* (2013.01); *G01N 35/1095* (2013.01);
(Continued)

(58) Field of Classification Search
None
See application file for complete search history.

(56) References Cited

U.S. PATENT DOCUMENTS 6,012,487 A *  1/2000  Hauck ................. F16K 11/0743
                                                137/625.11
8,234,939 B2 *  8/2012  Maeda ................... G01N 30/20
                                                73/864.21
(Continued)

FOREIGN PATENT DOCUMENTS

CN       1435687 A     8/2003
CN     102549421 A     7/2012
(Continued)

OTHER PUBLICATIONS

Written Opinion for PCT/JP2014/065433 dated Sep. 16, 2014. [PCT/ISA/237].
(Continued)

*Primary Examiner* — Jill A Warden
*Assistant Examiner* — Brittany I Fisher
(74) *Attorney, Agent, or Firm* — Sughrue Mion, PLLC

(57) ABSTRACT

A liquid sample introduction device including: a multiport valve having a port (a) in communication with a sampling loop, a port (f) in communication with a mobile phase supply passage, a port (e) in communication with a column, a port (d) in communication with a sample injection unit, a port (b) in communication with a measuring pump, and a port (c) in communication with a multi-position valve. The multi-position valve having a common port (g) in communication with the measuring pump, a port (i) in communication with the multiport valve, a port (j) in communication with a cleaning liquid supply passage, and a port (h) in communication with a washing container.

15 Claims, 6 Drawing Sheets

(51) Int. Cl.
*G01N 35/10* (2006.01)
*B01L 3/00* (2006.01)

(52) U.S. Cl.
CPC ... *B01L 2200/026* (2013.01); *B01L 2200/141* (2013.01); *B01L 2300/06* (2013.01); *B01L 2300/14* (2013.01); *B01L 2400/0487* (2013.01); *B01L 2400/0622* (2013.01); *G01N 30/20* (2013.01)

(56) References Cited

U.S. PATENT DOCUMENTS

| | | | | |
|---|---|---|---|---|
| 8,322,374 | B2* | 12/2012 | Tomita | G01N 30/20 137/625.11 |
| 8,522,628 | B2* | 9/2013 | Seki | G01N 30/20 73/864.21 |
| 2002/0146349 | A1* | 10/2002 | Gygi | G01N 30/08 422/70 |
| 2003/0143123 | A1* | 7/2003 | Maeda | G01N 30/24 422/510 |
| 2004/0175833 | A1* | 9/2004 | Tatsumi | G01N 35/1097 436/49 |
| 2006/0045810 | A1* | 3/2006 | Choikhet | G01N 30/20 422/400 |
| 2006/0196282 | A1* | 9/2006 | Tatsumi | G01N 35/1097 73/863.83 |
| 2007/0095158 | A1* | 5/2007 | Maeda | G01N 30/24 73/864 |
| 2008/0134804 | A1* | 6/2008 | Maeda | G01N 35/1097 73/863.01 |
| 2009/0100942 | A1* | 4/2009 | Maeda | G01N 35/1079 73/863.01 |
| 2011/0016955 | A1* | 1/2011 | Cormier | G01N 1/38 73/61.55 |
| 2011/0247405 | A1* | 10/2011 | Yasunaga | G01N 30/18 73/61.55 |
| 2012/0024048 | A1* | 2/2012 | Maeda | G01N 30/20 73/61.55 |
| 2012/0111127 | A1* | 5/2012 | Maeda | G01N 30/20 73/863.01 |
| 2013/0014597 | A1* | 1/2013 | Yasunaga | G01N 30/24 73/863.01 |
| 2013/0306117 | A1* | 11/2013 | Yamazaki | G01N 35/1004 134/171 |

FOREIGN PATENT DOCUMENTS

| | | |
|---|---|---|
| CN | 102879505 A | 1/2013 |
| JP | 10-170488 A | 6/1998 |
| JP | 2001-255316 A | 9/2001 |
| JP | 2003-215118 A | 7/2003 |
| JP | 2006-292641 A | 10/2006 |
| JP | 2013-019757 A | 1/2013 |

OTHER PUBLICATIONS

International Search Report for PCT/JP2014/065433, dated Sep. 16, 2014.
Communication dated Oct. 30, 2017 from the State Intellectual Property Office of the P.R.C. In counterpart application No. 201480079764.2.

* cited by examiner

LIQUID SAMPLE INTRODUCTION DEVICE

This is a National Stage of International Application No. PCT/JP2014/065433 filed Jun. 11, 2014, the contents of all of which are incorporated herein by reference in their entirety.

TECHNICAL FIELD

The present invention relates to a liquid sample introduction device that collects sample liquid from a sample container for an analyzing device that analyzes liquid, such as for a liquid chromatograph, and introduces the sample liquid into the analyzing device.

BACKGROUND ART

A liquid chromatograph employs a liquid sample introduction device for selecting one from many liquid samples and introducing it into a column. FIG. 15 is a diagram schematically showing flow passages of a liquid sample introduction device in a conventional liquid chromatograph (Patent Literature 1).

As shown in FIG. 15, in a liquid sample introduction device 120 for a liquid chromatograph, two valves are used: a first passage switching valve 101 for switching a high-pressure mobile phase to be supplied to a column 104; and an normal-pressure second passage switching valve 102 for collecting sample liquid and washing a sampling needle 111. In order to connect a plurality of ports one another, both valves employ a rotary valve including a stator having openings corresponding to the respective ports and a rotor having communication passages to allow two of the openings of the stator to communicate with each other.

In the example of FIG. 15, the first passage switching valve 101 employs a rotary valve having six ports a' to f'. Four of the ports are connected to a mobile phase liquid supply pump 103, the column 104 of the chromatograph, the sampling needle 111, and a sample injection unit 112, respectively, and two of the ports are connected to two ports of the second passage switching valve 102, respectively.

The second passage switching valve 102 employs a rotary valve having one common port g' and five peripheral ports. The common port g' and one peripheral port 1' are connected to a measuring pump 113, and the other four peripheral ports to the two ports of the first passage switching valve 101, a cleaning liquid container 107 and a washing container 114.

In this liquid sample introduction device, a procedure for introducing a sample to the column 104 is as follows. First, the rotor of the first passage switching valve 101 is set at the position shown in FIG. 15 to connect the mobile phase liquid supply pump 103 and the column 104 to each other. Thereby, a mobile phase in a mobile phase container 105 is supplied to the column 104 at high pressure. In this state, the rotor of the second passage switching valve 102 is switched to the position shown in FIG. 15 and the sampling needle 111 is inserted into a sample liquid container 106 to suck a liquid sample of a predetermined amount with the measuring pump 113 and to retain it in a sampling loop 116. Next, the sampling needle 111 is inserted into the sample injection unit 112 and the rotor of the first passage switching valve 101 is rotated, and thereby, the liquid sample retained in the sampling loop 116 is pushed out into the sample injection unit 112 with the mobile phase liquid supply pump 103. Thereby, the liquid sample is injected into the mobile phase and sent to the column 104.

In the case where after injecting a first liquid sample as above, another (second) liquid sample is handled in the liquid sample introduction device 120, the first liquid sample attached to inside and outside of the sampling needle 111 must be prevented from contaminating the second liquid sample (contamination). Thus, the sampling needle 111 is inserted into the washing container 114 and the exterior of the sampling needle 111 is washed by, first, setting the rotor of the second passage switching valve 102 to the position indicated by the solid line in FIG. 16 to suck and retain cleaning liquid once in the measuring pump 113, and next, switching the rotor to the position indicated by the broken line to feed the cleaning liquid retained in the measuring pump 113 to the washing container 114. Moreover, the interior of the sampling needle 111 is washed by discharging the cleaning liquid from the measuring pump 113 with the passage being rotated counter clockwise by 60 degrees further from the position indicated by the broken line in FIG. 16. These steps are repeated as needed to sufficiently wash the interior and the exterior of the sampling needle 111.

CITATION LIST

Patent Literature

[Patent Literature 1] JP 10-170488 A

SUMMARY OF INVENTION

Technical Problem

The conventional configuration shown in FIG. 15 and FIG. 16 has a problem in that all the ports of the second passage switching valve 102 are occupied for connecting just the least set of components, and no available port remains. Thus, any additional component cannot be connected unless the number of passage switching valves or the number of ports of the passage switching valve is increased.

A problem to be solved by the present invention is to provide a liquid sample introduction device in which an additional component can be easily added without increasing the number of passage switching valves or the number of ports of a passage switching valve.

Solution to Problem

A liquid sample introduction device according to the present invention, which has been made to solve the aforementioned problem, includes:

a) a sampling loop including a sampling needle at its end;

b) a measuring pump, having two ports, for sucking liquid from one port and discharging the liquid from the one port or the other port;

c) a multiport valve having a port in communication with the sampling loop, a port in communication with a passage to which a mobile phase is supplied, a port in communication with a column, a port in communication with a sample injection unit, a port in communication with the one port of the measuring pump, and a port in communication with a multi-position valve mentioned below, the multiport valve being switchable between an injection state where a passage is formed in which the mobile phase flows to the column via the sampling loop, the sampling needle and the sample injection unit and a loading state where a passage is formed in which the mobile phase flows to the column via neither of the sampling loop, the sampling needle nor the sample injection unit; and d) the multi-position valve having a common port in communication with the other port of the measuring pump, a port in communication with the multiport valve, a port in communication with a passage to which cleaning liquid is supplied, and a port in communication with a washing container, the multi-position valve being switchable between a state where the common port is alternately connected to the other ports and a state where ports except the common port are connected to each other.

In the liquid sample introduction device according to the present invention, the multiport valve is set in the state where the port in communication with the sampling loop and the port in communication with the measuring pump are connected to each other, and thereby, sample liquid is measured by the measuring pump through the needle inserted into a sample liquid container, collected (sucked) and retained in the sampling loop. This state is preferably realized in the loading state of the multiport valve, during which the mobile phase is being supplied to the column. After collecting the sample liquid, the multiport valve is switched to the injection state to transfer the collected sample liquid with the mobile phase.

In the liquid sample introduction device according to the present invention, the measuring pump is provided on the passage connecting one port of the multiport valve to the common port of the multi-position valve. In a liquid sample introduction device, the passage connecting the multiport valve and the multi-position valve to each other is essential for collecting sample liquid from a sample liquid container at low pressure and transferring it to a column at high pressure. Since in the liquid sample introduction device according to the present invention, the measuring pump is also provided on this passage, the passages for the measuring pump (the passage connecting the port g' and the measuring pump 113 to each other and the passage connecting the port 1' and the measuring pump 113 to each other in the example of FIG. 15) are not needed to be provided, which enables a manual syringe or the like to be connected to an available port thus obtained.

Advantageous Effects of Invention

Since in the liquid sample introduction device according to the present invention, a dedicated passage for operating a measuring pump is not needed to be provided to a multi-position valve, a manual syringe or the like can be connected to the port conventionally used for providing the dedicated passage.

DESCRIPTION OF EMBODIMENTS

An embodiment of a liquid sample introduction device according to the present invention is described using FIG. 1 to FIG. 13.

Figure 1:
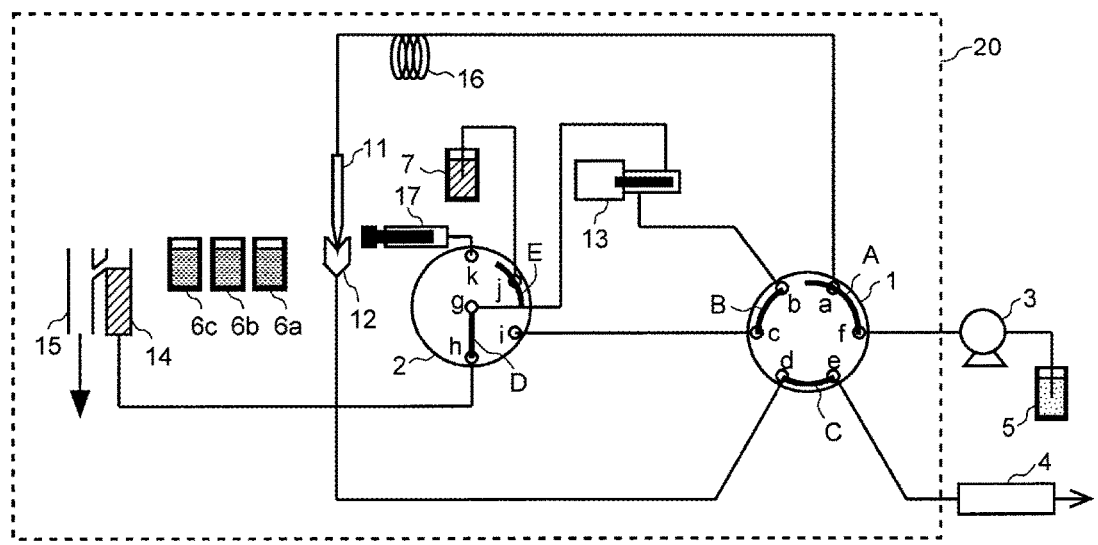
FIG. 1 is a flow passage configuration diagram of an embodiment of a liquid sample introduction device according to the present invention (collection preparing position).

In a liquid sample introduction device 20 of FIG. 1, a first passage switching valve (high-pressure valve) 1 has six ports a to f in its stator and three passage grooves A to C in its rotor. The port a of the first passage switching valve 1 is connected to a needle 11 via a sampling loop 16, the port b to a port g of a second passage switching valve (low-pressure valve) 2 via a plunger-type measuring pump 13, the port c to a port i of the second passage switching valve 2, the port d to a sample injection unit 12, the port e to a column 4, and the port f to a mobile phase container 5 via a liquid supply pump 3, respectively.

While in this embodiment, one kind of mobile phase is used for simplicity, a plurality of sets of mobile phase containers and liquid supply pumps, and a mixer for mixing a plurality of mobile phases can be disposed to mix the kinds of mobile phases or to change their mixing ratio in time course (gradient analysis).

The passage groove A is a passage groove for connecting the port f to the port a or the port e, the passage groove B is a passage groove for connecting the port b to the port a or the port c, and the passage groove C is a passage groove for connecting the port d to the port c or the port e. The passage groove A is formed to be longer than the passage groove B and the passage groove C, and, for example, as in a "neutral position of the measuring pump" (FIG. 5) mentioned later, the state where only the port e and the port f are connected to each other and the other ports are not connected can be realized.

In the following description, a position where the port f is connected to the port a, the port b to the port c, and the port d to the port e is referred to as a "first position", and a position where the port a is connected to the port b, the port c to the port d, and the port e to the port f as a "second position".

The second passage switching valve 2 has five ports g to k in its stator and two passage grooves D and E in its rotor. The port g of the second passage switching valve 2 is connected to the port b of the first passage switching valve 1 via the measuring pump 13, the port h to a washing container 14, the port i to the port c of the first passage switching valve 1, the port j to a cleaning liquid container 7, and the port k to a manual syringe 17, respectively. The port g is a common port and can be alternatively connected to any of the ports h to k through the passage groove D. Moreover, the passage groove E is a passage groove for connecting any adjacent two ports of the ports h to k to each other.

Figure 15:
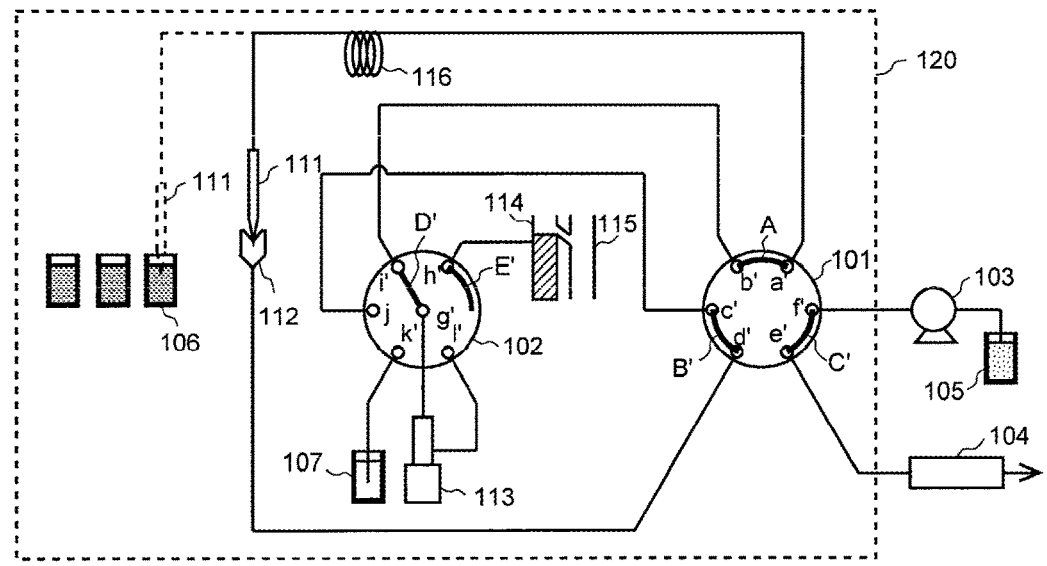
FIG. 15 is a diagram showing a flow passage configuration of a conventional liquid sample introduction device.
Figure 16:
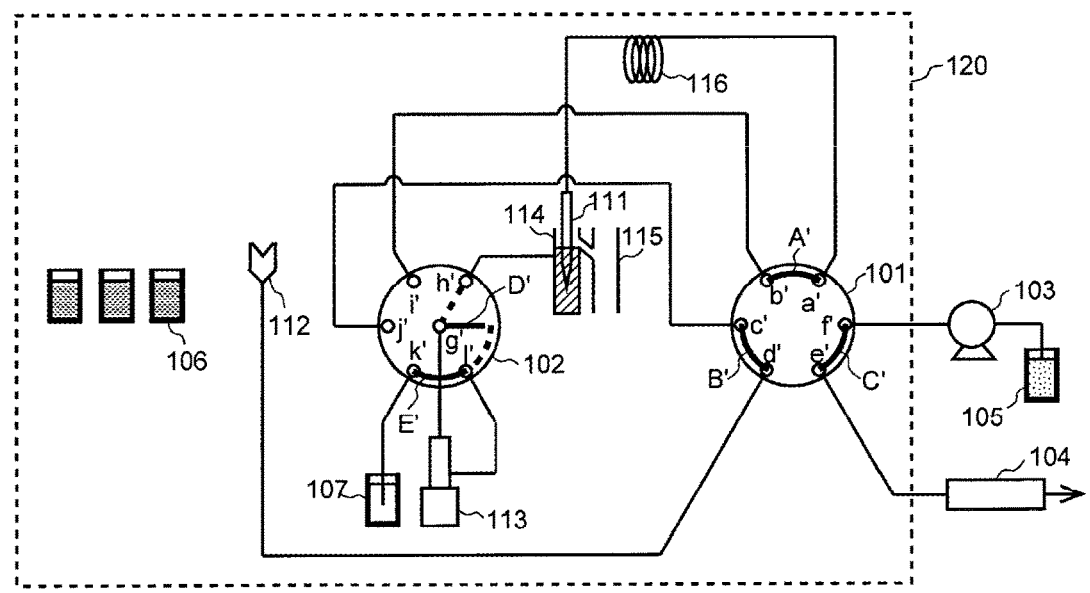
FIG. 16 is a diagram showing another flow passage configuration of the conventional liquid sample introduction device.

In the liquid sample introduction device 20 of this embodiment, two ports of the measuring pump 13 for sucking/discharging liquid are respectively connected to the port b of the first passage switching valve 1 and the common port g of the second passage switching valve 2. With this configuration, in the liquid sample introduction device 20 of this embodiment, while the passage switching valve having less ports by one than in the conventional liquid sample introduction device 120 shown in FIG. 15 is used, the second passage switching valve 2 has an available port (port k). Therefore, the manual syringe 17 or the like can be connected to these ports.

The measuring pump 13 is operated in the state where one of the passages connected to the two ports of the measuring pump 13 is closed. Specifically, the first passage switching valve 1 or the second passage switching valve 2 rotates the rotor to close any one of the passages of the measuring pump 13 positioned on the first passage switching valve 1 side and on the second passage switching valve 2 side, and by discharge operation with measuring pump 13, liquid is discharged to the passage on the open side. Moreover, by sucking operation with measuring pump 13 in this state, liquid is sucked from the passage on the open side. Accordingly, for example, in the passage between the port b of the first passage switching valve 1 and the common port g of the second passage switching valve 2, the measuring pump 13 can supply liquid from the first passage switching valve 1 side to the second passage switching valve 2 side, and vice versa, supply liquid from the second passage switching valve 2 side to the first passage switching valve 1 side (details are mentioned later).

Figure 2:
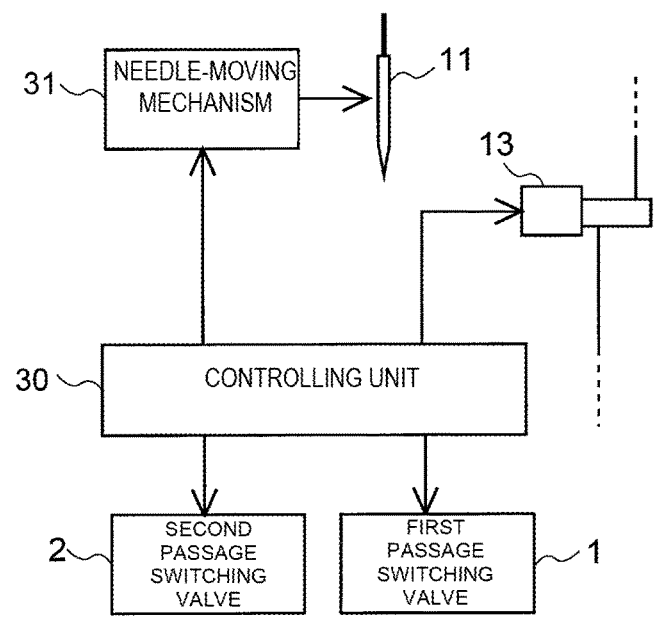
FIG. 2 is a schematic configuration diagram of a control mechanism of the liquid sample introduction device of this embodiment.

FIG. 2 is a block diagram schematically showing a control system of the liquid sample introduction device. The first passage switching valve 1 and the second passage switching valve 2, the measuring pump 13, and a needle-moving mechanism 31 for the needle 11 are connected to a controlling unit 30, and the controlling unit 30 controls switching of the ports of the first passage switching valve 1 and the second passage switching valve 2, drive of the plunger of the measuring pump 13, and horizontal movement and vertical movement of the needle 11.

Sample introduction operation by the liquid sample introduction device 20 of this embodiment is described.

FIG. 1 shows a "collection preparing position", where discharge operation with the measuring pump 13 is performed for succeeding collection of sample liquid. The first passage switching valve 1 is in the first position and the second passage switching valve 2 is in the state where the common port g and the port h are connected to each other. At this position, since the port i of the second passage switching valve 2 is closed, the passage of the measuring pump 13 on the first passage switching valve 1 side is closed. Meanwhile, the passage of the measuring pump 13 on the second passage switching valve 2 side is open through the common port g, the port h and the washing container 14. When the measuring pump 13 performs discharge operation in this state, liquid in the measuring pump 13 (for example, cleaning liquid) is discharged to the second passage switching valve 2 side to be expelled to a drain 15 through the washing container 14.

Moreover, the liquid supply pump 3 supplies the mobile phase in the mobile phase container 5 to the column 4 at a predetermined pressure through the port f of the first passage switching valve 1, the port a, the sampling loop 16, the sampling needle 11, the sample injection unit 12, and the port d and the port e of the first passage switching valve 1 (corresponding to an injection state in the present invention).

Figure 3:
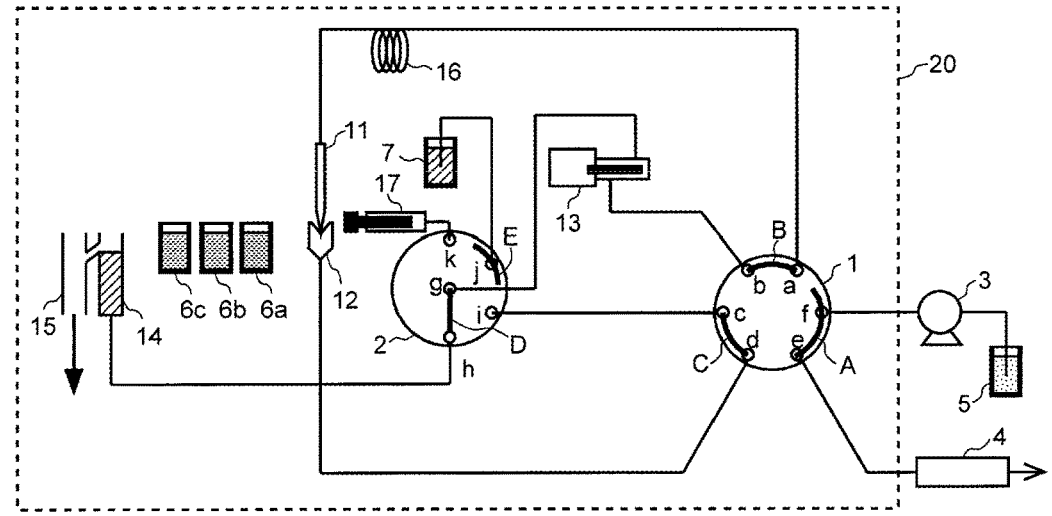
FIG. 3 is a flow passage configuration diagram of the liquid sample introduction device of this embodiment (pressure releasing position).

FIG. 3 shows a "pressure releasing position" where the first passage switching valve 1 is changed to the second position from the state of FIG. 1. At this position, the passage for supplying the mobile phase from the mobile phase container 5 to the column 4 is short-cut (corresponding to a loading state in the present invention). Then, the passage passing through the sampling loop 16, the sampling needle 11 and the sample injection unit 12 is connected to the measuring pump 13, the common port g, the port h and the washing container 14 to be released to the atmospheric pressure.

Figure 4:
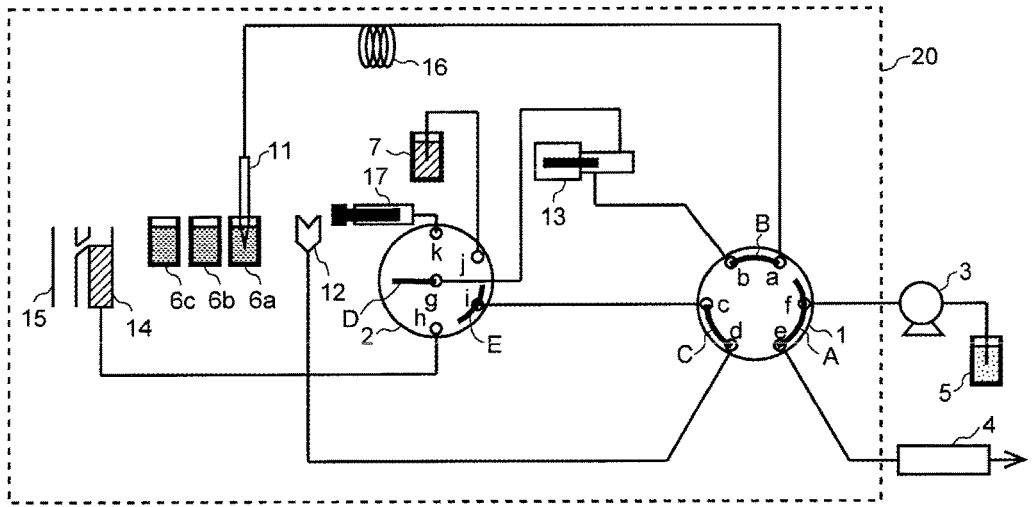
FIG. 4 is a flow passage configuration diagram of the liquid sample introduction device of this embodiment (loading position).

FIG. 4 shows a "loading position" for collecting sample liquid (corresponding to a first loading state in the present invention). While the first passage switching valve 1 is at the second position likewise in FIG. 3, in the second passage switching valve 2, any ports are not connected between them. Moreover, the sampling needle 11 is moved onto a sample liquid container 6a and immersed in sample liquid in the sample liquid container 6a. Since the passage from the sampling needle 11 to the measuring pump 13 is filled with the mobile phase and the cleaning liquid, when the measuring pump 13 performs sucking operation in this state, the sample liquid is sucked from the sample liquid container 6a, which fills the sampling loop 16. After that, the needle 11 is immersed in the cleaning liquid in the washing container 14 to wash the exterior of the needle 11. Thereby, in next injection operation, the sample injection unit 12 is prevented from being contaminated by the sample liquid wetting the needle 11.

Figure 5:
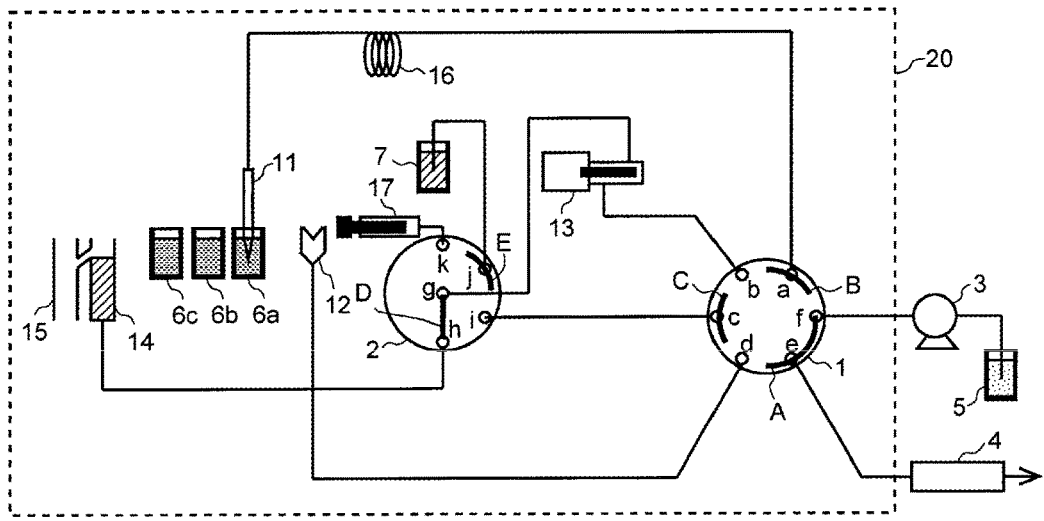
FIG. 5 is a flow passage configuration diagram of the liquid sample introduction device of this embodiment (neutral position of a measuring pump).

Now, in general, when the interior of a passage is filled with liquid, a rate gradient occurs in the passage. Hence, the internal volume of the sampling loop 16 is often configured to be approximately twice an amount that the measuring pump 13 can measure at one time. Therefore, when the sampling loop 16 is filled with the sample liquid equal to or exceeding the measurement volume of the measuring pump 13, a "neutral position of the measuring pump" shown in FIG. 5 (corresponding to a second loading state in the present invention) is used. In this case, washing of the exterior of the sampling needle 11 as mentioned above is not performed, and the sampling needle 11 is allowed to stay in the sample liquid container 6a. As shown in FIG. 5, at the "neutral position of the measuring pump", in the first passage switching valve 1, only the port e and the port f are connected to each other, and in the second passage switching valve 2, only the common port g and the port h are connected to each other. Then, operations of sucking the sample liquid in the state shown in FIG. 4 and expelling the mobile phase in the measuring pump 13 in the state shown in FIG. 5 are repeated to introduce, into the sampling loop 16, the sample liquid by an amount exceeding the amount that the measuring pump 13 can measure at one time.

Typically, before collecting the sample liquid, using the "collection preparing position" in FIG. 1, the mobile phase is introduced into the passage in communication with the column 4 via the sampling loop 16, the sampling needle 11 and the sample injection unit 12. In this state, the mobile phase is supplied to the sample injection unit 12 from the liquid supply pump 3 at high pressure. When the passage is switched from the "collection preparing position" to collect a sample, the sampling needle 11 is taken out of the sample injection unit 12 and the sample injection unit 12 is open. Hence, the mobile phase would flow back from the sample injection unit 12 if the passage in communication with the sample injection unit 12 were not closed.

To prevent such backflow of the mobile phase, at the "loading position" in FIG. 4, the passage in communication with the sample injection unit 12 is closed at the port i of the second passage switching valve 2 via the port d and the port c of the first passage switching valve 1, and moreover, at the "neutral position of the measuring pump" in FIG. 5, the passage in communication with the sample injection unit 12 is closed at the port d of the first passage switching valve 1. Thereby, backflow of the mobile phase from the sample injection unit 12 in collecting the sample liquid is prevented.

While the case where the sample liquid is sucked from the sample liquid container 6a plural times is herein described as an example, portions of sample liquid can also be sucked sequentially from a plurality of sample liquid containers 6a, 6b and 6c to be introduced into the sampling loop 16. Alternatively, for example, the sample liquid to be analyzed is contained in the sample liquid container 6a, dilution liquid being in the sample liquid container 6b, and thus, the sample liquid and the dilution liquid can be sequentially introduced into the sampling loop 16 to dilute the sample liquid. In other words, the aforementioned operation enables pre-processing of the sample.

Moreover, at the positions shown in FIG. 3 to FIG. 5, the port f and the port e of the first passage switching valve 1 are connected to each other, and during collection and pre-processing operations of the sample liquid, the mobile phase is being continuously supplied to the column 4. Thereby, the column 4 can be prevented from being damaged due to stop of supplying the mobile phase to the column or fluctuation in supply pressure.

The "neutral position of the measuring pump" in FIG. 5 is a position that can be realized in the case where the passage groove A of the first passage switching valve 1 is formed to be longer than the passage groove B and the passage groove C as in the this embodiment.

Figure 6:
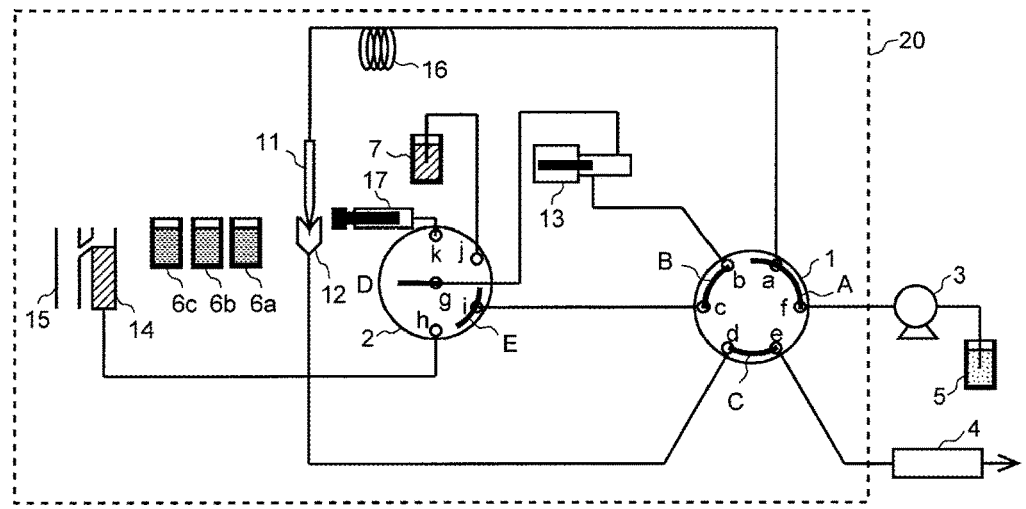
FIG. 6 is a flow passage configuration diagram of the liquid sample introduction device of this embodiment (analysis starting position).

FIG. 6 shows an "analysis starting position", where the first passage switching valve 1 is in the first position and the second passage switching valve 2 is in the state where any ports are not connected between them. Moreover, the end of the sampling needle 11 is moved onto the sample injection unit 12. When the liquid supply pump 3 is operated in this state to supply the mobile phase, the sample liquid filling the sampling loop 16 is fed into the column 4 along with the mobile phase, and its components are separated during passing through the column 4 to be sequentially detected by a not-shown detector.

Figure 7:
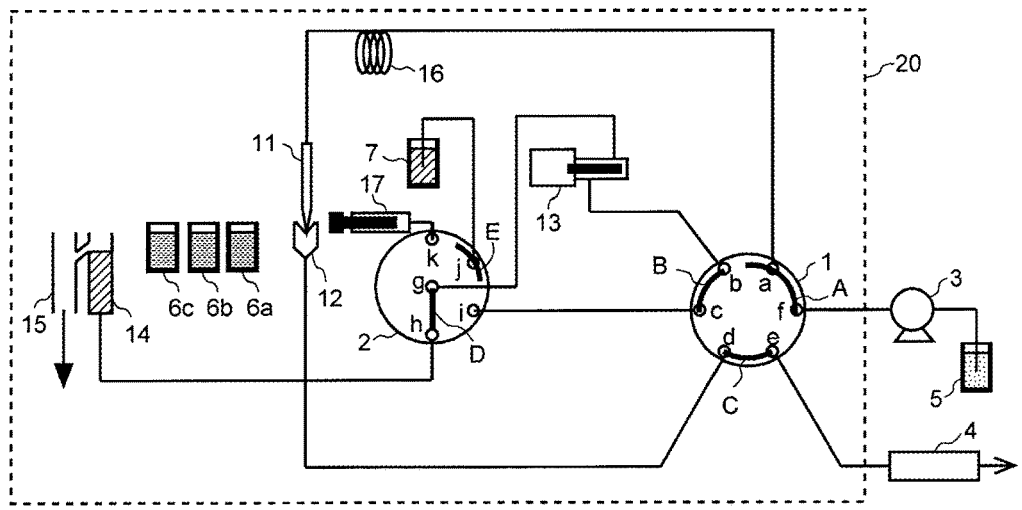
FIG. 7 is a flow passage configuration diagram of the liquid sample introduction device of this embodiment (cleaning liquid discharge position).

FIG. 7 shows a "cleaning liquid discharge position", where the first passage switching valve 1 is in the first position and the second passage switching valve 2 is in the state where only the common port g and the port h are connected to each other. At the cleaning liquid discharge position, while the mobile phase is being supplied using the liquid supply pump 3 to perform the analysis, the cleaning liquid in the measuring pump 13 is discharged and expelled from the drain 15 through the washing container 14.

Figure 8:
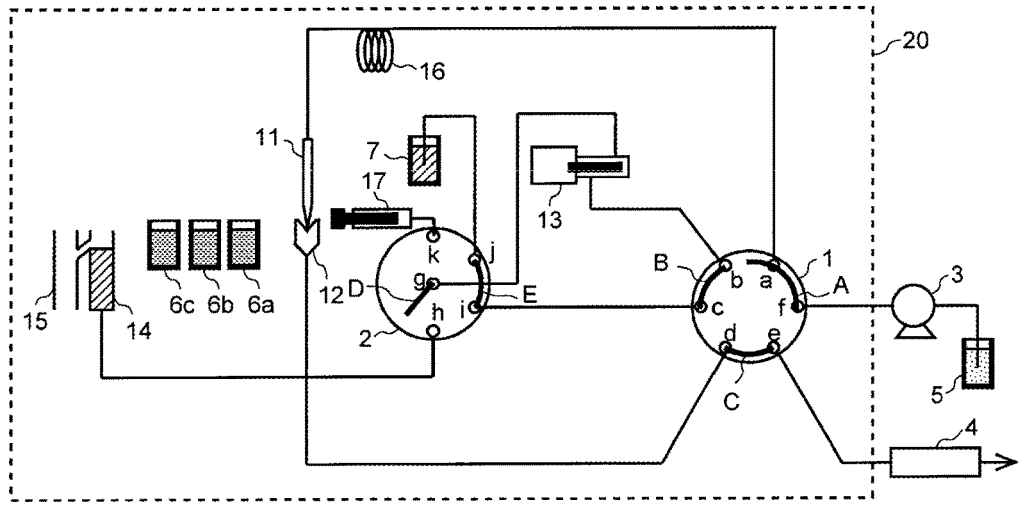
FIG. 8 is a flow passage configuration diagram of the liquid sample introduction device of this embodiment (cleaning liquid sucking position).

FIG. 8 shows a "cleaning liquid sucking position", where in the first passage switching valve 1, the state of the first position is maintained, and in the second passage switching valve 2, the port i and the port j are connected to each other. In this state, the measuring pump 13 sucks the cleaning liquid from the cleaning liquid container 7 via the port b, the port c, the port i and the port j. The connection state of the first passage switching valve 1 is the same as that at the analysis starting position and the analysis is being continuously performed.

Figure 9:
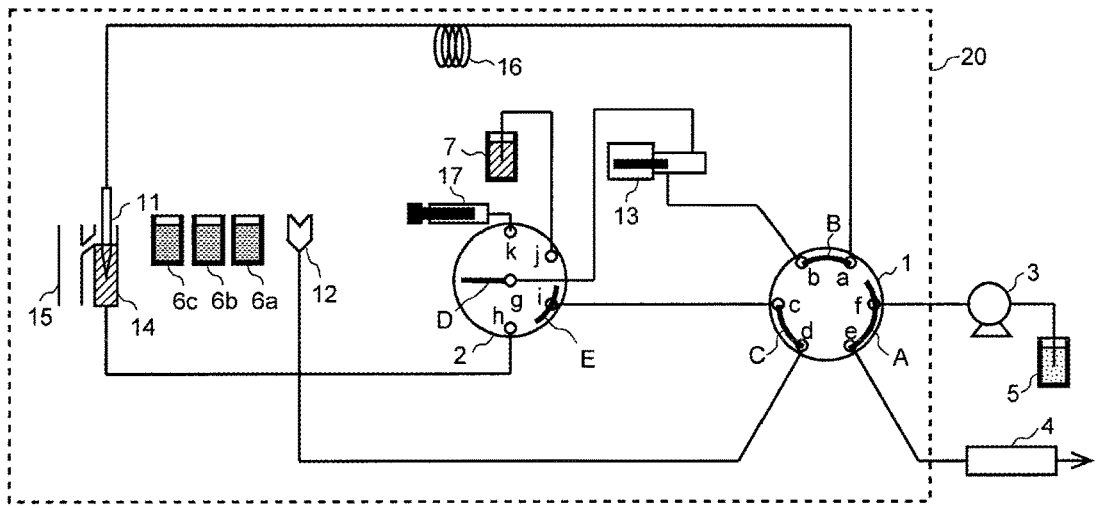
FIG. 9 is a flow passage configuration diagram of the liquid sample introduction device of this embodiment (needle washing position).

FIG. 9 shows a "needle washing position". The first passage switching valve 1 is switched to the second position and the second passage switching valve 2 is switched to the state where any ports are not connected between them. Moreover, the sampling needle 11 is moved onto the washing container 14. Thereby, the exterior of the sampling needle 11 is washed with the cleaning liquid in the washing container 14.

Figure 10:
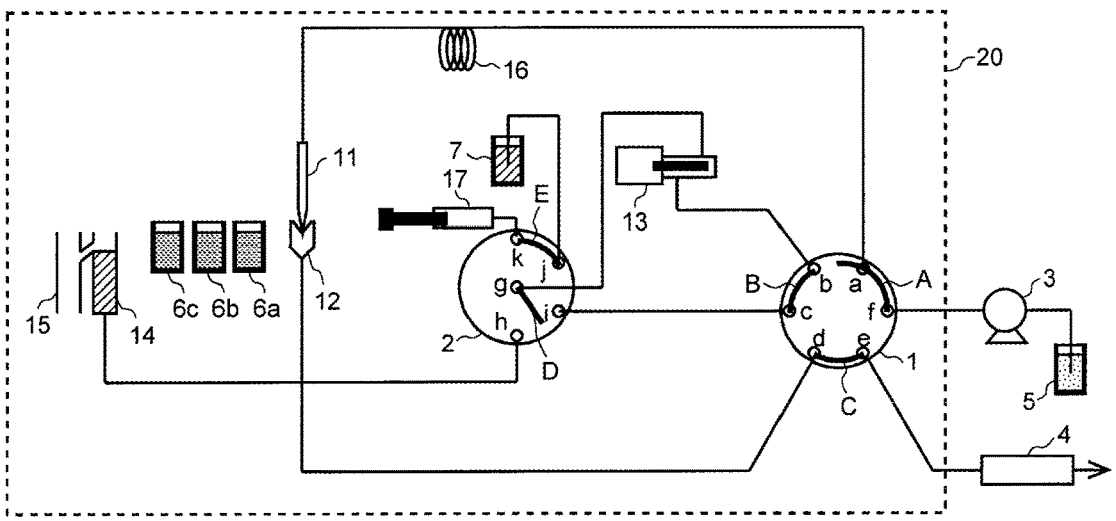
FIG. 10 is a flow passage configuration diagram of the liquid sample introduction device of this embodiment (cleaning liquid manual sucking position).

When using the manual syringe 17, instead of using the measuring pump 13, and it is desired to quickly fill the passage from the cleaning liquid container 7 to the port j of the second passage switching valve 2 with the cleaning liquid, a "cleaning liquid manual sucking position" shown in FIG. 10 is to be used. In the first passage switching valve 1, the state of the first position is still maintained, and in the second passage switching valve 2, the port j and the port k are connected to each other. Since the manual syringe 17 can be used to properly increase or decrease (in particular, increase) an amount of sucking the cleaning liquid, it is preferable, for example, when the kind of the cleaning liquid 7 has been changed or the similar case. When the cleaning liquid sucked in the manual syringe 17 is expelled, the common port g is connected to the port k, and the cleaning liquid is fed to a proper passage via the measuring pump 13.

Figure 11:
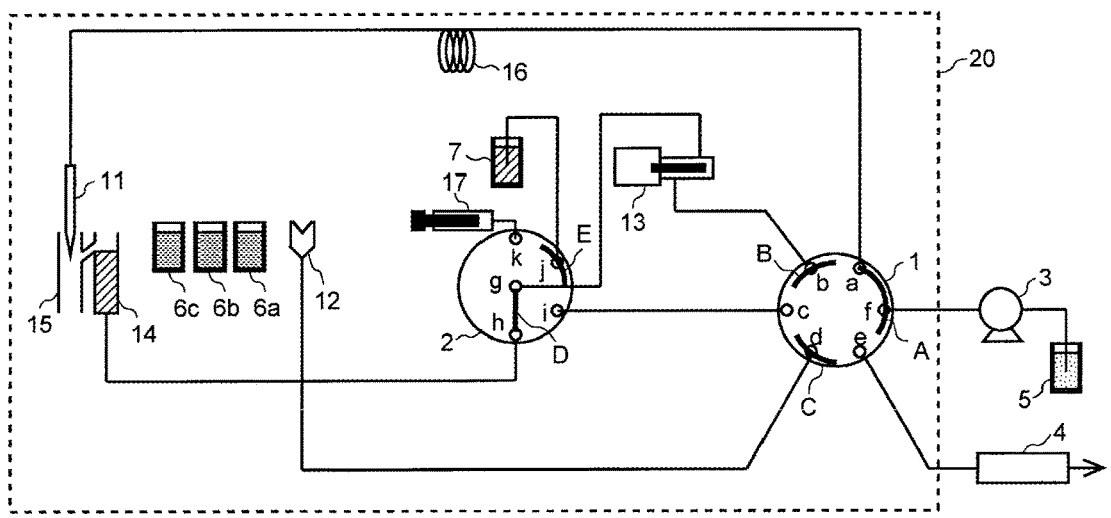
FIG. 11 is a flow passage configuration diagram of the liquid sample introduction device of this embodiment (needle flushing/auto-purging position).

FIG. 11 shows a "needle flushing/auto-purging position" (corresponding to a purging state in the present invention) used for replacing, before analysis, the liquid in the passage including the interior of the sampling needle 11 (the mobile phase, the sample liquid and the like used in previous analysis) by the mobile phase. The first passage switching valve 1 is switched to the state where only the port f and the port a are connected to each other, and the second passage switching valve 2 to the state where only the common port g and the port h are connected to each other. Moreover, the sampling needle 11 is moved onto the drain 15. When the liquid supply pump 3 is operated in this state, the mobile phase is expelled to the drain 15 via the port f, the port a, the sampling loop 16 and the sampling needle 11.

Similarly to the "neutral position of the measuring pump" in FIG. 5, the "needle flushing/auto-purging position" in FIG. 11 is also a position that can be realized in the case where the passage groove A of the first passage switching valve 1 is formed to be longer than the passage groove B and the passage groove C.

At the "needle flushing/auto-purging position" in FIG. 11, the passage in communication with the sample injection unit 12 is closed at the port d of the first passage switching valve 1. Accordingly, there is no concern of backflow of the mobile phase from the sample injection unit 12 during replacing operation of the liquid in the passage including the interior of the sampling needle 11 by the mobile phase.

Conventionally, when the interior of the passage is replaced by the mobile phase, the mobile phase is supplied to the whole passage in communication with the column 4.

Accordingly, since the passage in communication with the column 4 has a small internal diameter, and therefore, large passage resistance, the mobile phase can only be supplied at a low rate, which takes a long time to replace the whole passage by the mobile phase. In contrast, at the "needle flushing/auto-purging position", the end of the sampling needle 11 is open, and the mobile phase can be supplied into the passage to the sampling needle 11 at a high rate to replace the interior of the passage by the mobile phase in a short time. Moreover, the previous sample remaining in the interior of the sampling needle 11 can be washed out with the mobile phase 5 at a high flow rate to suppress an influence due to a remainder of the previous sample liquid in measuring next sample liquid (carry-over).

Figure 12:
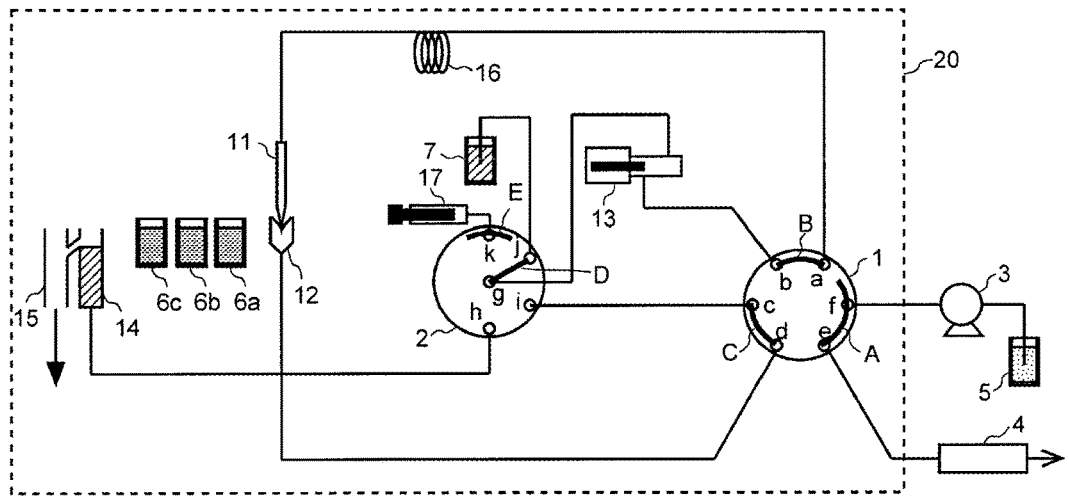
FIG. 12 is a flow passage configuration diagram of the liquid sample introduction device of this embodiment (sucking position for internal passage washing).
Figure 13:
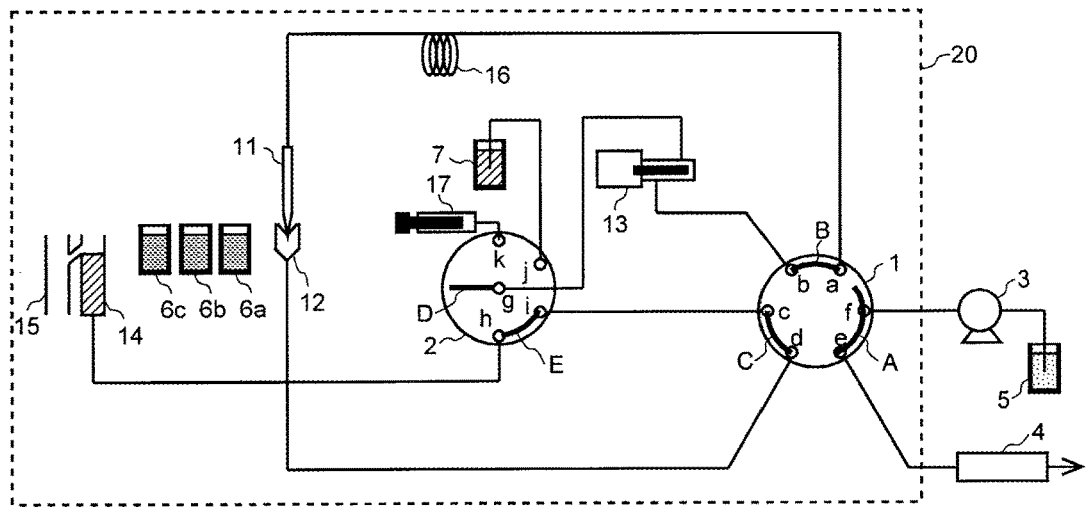
FIG. 13 is a flow passage configuration diagram of the liquid sample introduction device of this embodiment (discharge position for internal passage washing).
Figure 14:
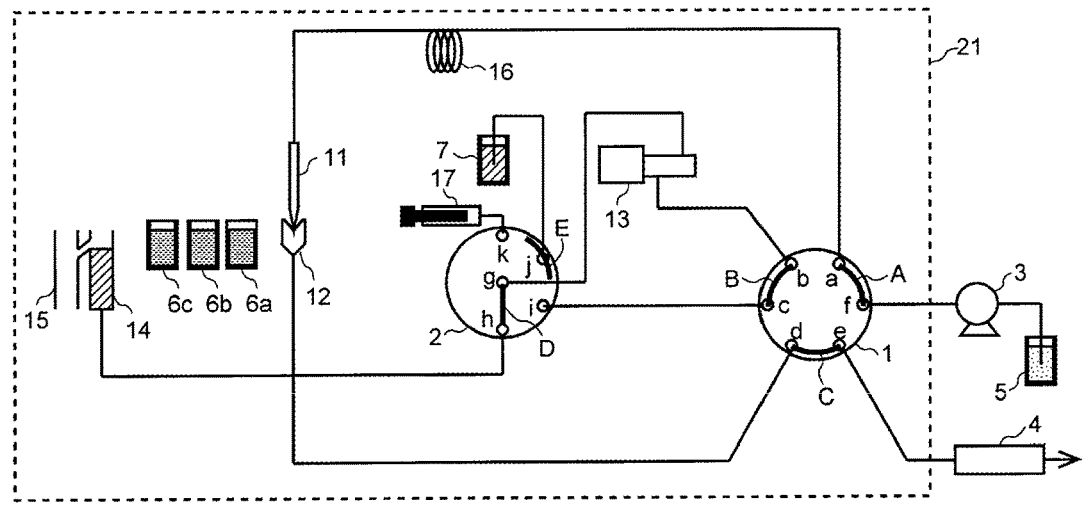
FIG. 14 is a flow passage configuration diagram of a liquid sample introduction device of a modification.

FIG. 12 and FIG. 13 show a "sucking position for internal passage washing" and an "internal passage washing discharge position" for washing the entire passage except the passage directly in communication with the column 4 with the cleaning liquid in the cleaning liquid container 7. At any position of these, the first passage switching valve 1 is in the second position, and the connection state of the second passage switching valve switched to wash the interior of the passage. Specifically, at the "sucking position for internal passage washing", the common port g and the port j are connected to each other to suck the cleaning liquid by the measuring pump 13, and at the "internal passage washing discharge position", the port h and the port i are connected to each other to supply the cleaning liquid into the passage passing through the measuring pump 13, the port b, the port a, the sampling loop 16, the sampling needle 11, the sample injection unit 12, the port d, the port c, the port i and the port h, that is, almost the entire passage except the passage directly in communication with the column 4 to be washed. During this, the liquid supply pump 3 is being operated to continue supply of the mobile phase to the column 4, which prevents the column 4 from being damaged.

In the liquid sample introduction device 20 of this embodiment, the measuring pump 13 is provided on the passage between the first passage switching valve 1 and the second passage switching valve 2. Therefore, a plurality of cleaning liquid containers can be connected to the second passage switching valve 2 as mentioned above. Moreover, the following effect is also obtained.

Typically, in a liquid sample introduction device, a first passage switching valve to which a liquid supply pump and a column are connected employs a high-pressure valve, and a second passage switching valve to which a cleaning liquid container and the like are connected employs a low-pressure valve. As in the conventional liquid sample introduction device 120 of FIG. 15, when the second passage switching valve 102 is disposed in the middle of the passage formed between the measuring pump 113 and the sample liquid container 106, the passages of the second passage switching valve 102 are needed to be frequently switched in collecting the sample liquid, which causes leakage of the liquid to occur and the amount of sucking by the measuring pump 113 to be incorrect. In contrast, in the liquid sample introduction device 20 of this embodiment, since the passage between the measuring pump 13 and the sample liquid containers 6a, 6b and 6c does not contain the second passage switching valve 2, the passage of the second passage switching valve 2 are not needed to be frequently switched in collecting the sample liquid. Accordingly, leakage of the liquid hardly occurs and the measuring pump 13 can correctly measure the sample liquid.

The aforementioned embodiment is an example and can be properly modified in compliance with the spirit of the present invention.

In the aforementioned embodiment, an example in which the passage groove A of the first passage switching valve 1 is set to be longer than the passage groove B and the passage groove C, and thereby, the "neutral position of the measuring pump" in FIG. 5 and the "needle flushing/auto-purging position" in FIG. 11 are used is described. Meanwhile, in the case where the amount of the sample liquid collected by the measuring pump 13 does not exceed the amount of liquid that can be sucked by the measuring pump 13 in sucking operation at one time, and time required for operation of replacing the interior of the passage by the mobile phase is not needed to be shortened, these positions are not needed.

Accordingly, for example, the passage groove A, the passage groove B and the passage groove C can also be set to have the same lengths, or the passage groove B (or C), in addition to the passage groove A, can also be formed to be long.

REFERENCE SIGNS LIST

1 . . . First Passage Switching Valve
2 . . . Second Passage Switching Valve
3 . . . Liquid Supply Pump
4 . . . Column
5 . . . Mobile Phase Container
6a, 6b, 6c . . . Sample Liquid Container
7, 8, 9 . . . Cleaning Liquid Container
11 . . . Needle
12 . . . Sample Injection Unit
13 . . . Measuring Pump
14 . . . Washing Container
15 . . . Drain
16 . . . Sampling Loop
17 . . . Manual Syringe
20 . . . Liquid Sample Introduction Device
30 . . . Controlling Unit
31 . . . Needle-Moving Mechanism

The invention claimed is:

1. A liquid sample introduction device comprising:
a sampling loop including a sampling needle at an end of the sampling loop;
a measuring pump, having two ports, for sucking liquid from a first port of the two ports and discharging the liquid from the first port or a second port of the two ports;
a multiport valve including a plurality of high pressure ports including:
a first high pressure port in communication with the sampling loop,
a second high pressure port in communication with a mobile phase container including a mobile phase,
a third high pressure port in communication with a column,
a fourth high pressure port in communication with a sample injection unit,
a fifth high pressure port in communication with the first port of the two ports of the measuring pump, and
a sixth high pressure port,
the multiport valve being switchable between an injection state where the mobile phase flows from the mobile phase container to the column via the sampling loop, the sampling needle and the sample injection unit and a loading state where the mobile phase flows from the mobile phase container to the column without passing through the sampling loop, the sampling needle and the sample injection unit; and a multi-position valve including:
  a common port in communication with the second port of the two ports of the measuring pump and a plurality of low pressure ports including:
    a first low pressure port in communication with the sixth high pressure port of the multiport valve;
    a second low pressure port in communication with a cleaning liquid container including a cleaning liquid; and
    a third low pressure port in communication with a washing container; and
  a passage groove configured to be capable of connecting the common port to each of the plurality of low pressure ports.

2. The liquid sample introduction device according to claim 1,
wherein the multiport valve is switchable, in the loading state, between a first loading state where the first high pressure port in communication with the sampling loop and the fifth high pressure port in communication with the measuring pump are connected to each other and a second loading state where each of the first high pressure port in communication with the sampling loop and the fifth high pressure port in communication with the measuring pump is not connected to remaining high pressure ports of the plurality of high pressure ports.

3. The liquid sample introduction device according to claim 2, wherein a passage in communication with the sample injection unit is closable in the first loading state or the second loading state.

4. The liquid sample introduction device according to claim 1,
wherein the multiport valve is further switchable, in addition to the injection state and the loading state, to a purging state where the first high pressure port in communication with the sampling loop and the second high pressure port in communication with the mobile phase container are connected to each other and the third high pressure port in communication with the column is not connected to remaining high pressure ports of the plurality of high pressure ports s.

5. The liquid sample introduction device according to claim 4, wherein a passage in communication with the sample injection unit is closable in the purging state.

6. The liquid sample introduction device according claim 1, wherein a manual syringe is connected to one of plurality of low pressure ports of the multi-position valve.

7. The liquid sample introduction device according to claim 1, wherein the multi-position valve is switchable amongst:
  a first state where the common port is connected to one of the plurality of low pressure ports;
  a second state where two of the plurality of low pressure ports are connected to each other;
  a third state where the common port and the third low pressure port in communication with the washing container are connected to each other;
  a fourth state where the first low pressure port in communication with the multiport valve and the second low pressure port in communication with the cleaning liquid container are connected to each other;
  a fifth state where the common port and the second low pressure port in communication with the cleaning liquid container are connected to each other; and
  a state where the first low pressure port in communication with the multiport valve and the third low pressure port in communication with the washing container are connected to each other.

8. The liquid sample introduction device according to claim 7, wherein at a collection preparing position or a cleaning liquid discharge position:
  the multiport valve forms a passage in which the mobile phase flows to the column via the sampling loop, the sampling needle and the sample introduction unit,
  the multi-position valve connects the common port to the third low pressure port in communication with the washing container, and
  a passage of the measuring pump on the multiport valve side is in a closed state.

9. The liquid sample introduction device according to claim 7, wherein at a pressure releasing position:
  the multiport valve forms a passage in which the mobile phase flows to the column without passing through the sampling loop, the needle and the sample introduction unit and connects the first high pressure port in communication with the sampling loop to the fifth high pressure port in communication with the first port of the two ports of the measuring pump, and
  the multi-position valve connects the common port to the third low pressure port in communication with the washing container.

10. The liquid sample introduction device according to claim 7, wherein at a loading position or a needle washing position:
  the multiport valve forms the passage in which the mobile phase flows to the column without passing through the sampling loop, the sampling needle nor the sample introduction unit, and
  the plurality of low pressure ports of the multi-position valve are not connected to one another.

11. The liquid sample introduction device according to claim 7, wherein at an analysis starting position:
  the multiport valve forms a passage in which the mobile phase flows to the column via the sampling loop, the sampling needle and the sample introduction unit, and
  the plurality of low pressure ports of the multi-position valve are not connected to one another.

12. The liquid sample introduction device according to claim 7, wherein at a cleaning liquid sucking position:
  the multiport valve forms a passage in which the mobile phase flows to the column via the sampling loop, the sampling needle and the sample introduction unit, and
  the multi-position valve connects the first low pressure port in communication with the multiport valve to the second low pressure port in communication with the cleaning liquid container.

13. The liquid sample introduction device according to claim 7, wherein in the purging state:
  the multiport valve connects the first high pressure port in communication with the sampling loop to the second high pressure port in communication with the mobile phase container, and the third high pressure port in communication with the column is not connected to remaining high pressure ports of the plurality of high pressure ports, and
  the plurality of low pressure ports of the multi-position valve are not connected to one another.

14. The liquid sample introduction device according to claim 7, wherein at a sucking position for internal passage washing:

the multiport valve forms a passage in which the mobile phase flows to the column without passing through the sampling loop, the sampling needle and the sample introduction unit, and the multi-position valve connects the common port to the second low pressure port in communication with the cleaning liquid container.

15. The liquid sample introduction device according to claim 7, wherein at an internal passage washing discharge position:

the multiport valve forms a passage in which the mobile phase flows to the column without passing through the sampling loop, the sampling needle and the sample introduction unit, and the multi-position valve connects the first low pressure port in communication with the multiport valve to the third low pressure port in communication with the washing container.

* * * * *